United States Patent [19]

Brandli

[11] Patent Number: 4,894,947
[45] Date of Patent: * Jan. 23, 1990

[54] INSECT FEEDING STATION

[75] Inventor: Eugene H. Brandli, Towaco, N.J.

[73] Assignee: American Cyanamid Company, Stamford, Conn.

[*] Notice: The portion of the term of this patent subsequent to Jan. 14, 2003 has been disclaimed.

[21] Appl. No.: 180,718

[22] Filed: Apr. 4, 1988

Related U.S. Application Data

[63] Continuation of Ser. No. 681,079, Dec. 12, 1984, abandoned, which is a continuation of Ser. No. 406,671, Aug. 12, 1982, abandoned, which is a continuation-in-part of Ser. No. 251;684, Apr. 6, 1981, abandoned.

[51] Int. Cl.$^4$ .............................................. A01M 1/20
[52] U.S. Cl. ........................................ 43/131; 43/124
[58] Field of Search ................................... 43/131, 124

[56] References Cited

U.S. PATENT DOCUMENTS

| 547,220 | 10/1895 | Madden | 43/121 |
| 1,922,702 | 8/1933 | Kristman | 43/131 |
| 2,340,255 | 1/1944 | Weil | 43/131 |
| 2,359,341 | 10/1944 | Weil | 43/131 |
| 2,953,868 | 9/1960 | Chambers | 43/131 |
| 4,228,613 | 10/1980 | Kalnasy et al. | 43/131 |

Primary Examiner—Richard K. Seidel
Assistant Examiner—Carmine Cuda
Attorney, Agent, or Firm—Charles J. Fickey

[57] ABSTRACT

An insect feeding station having a central poison area, guide walls leading from the periphery of the station to the central poison area and a cover, optionally having transparent means to view said poison area. When the cover is transparent, or a portion or sections, thereof is transparent, the poison compartment may have a contrasting and luminous color under the poison to make removal of poison easily detectable.

2 Claims, 4 Drawing Sheets

INSECT FEEDING STATION

This application is a continuation of application Ser. No. 681,079, filed Dec. 12, 1984, now abandoned, which is a continuation of application Ser. No. 406,671, filed Aug. 12, 1982, now abandoned, which is a continuation-in-part of U.S. application Ser. No. 251,684, filed Apr. 6, 1981 now abandoned.

This invention relates to a device for destroying insects. It more particularly relates to an insect feeding station whereby poison may be administered to insects without endangering children or domestic animals, and having means to guide insects to the poison.

Various types of devices have been known in the prior art for destroying insects. In some devices, the insects are trapped in the device after entering, either by mechanical construction, or by sticking to a gummy substance. In either instance, the device is soon full and useless. In devices which contained a poison, it was easy to shake out loose poison, or probe through openings to reach the poison, thus making them a danger to children or small domestic animals. In addition, prior devices are generally of a construction that the interior of the device is difficult to view so that it is not readily ascertainable whether insects are using the device or how much poison has been used.

It is, therefore, an object of this invention to provide an insect feeding station which is not dangerous to children.

A further object is to provide an insect feeding station in which it is readily possible to detect the use of the poison.

Another object is to provide means to guide insects toward the poison in an insect feeding station.

These and other objects of the invention will become apparent as the description thereon proceeds.

The objects of this invention may be attained and the disadvantages of the prior art devices overcome by the use of the present invention. The device of the present invention has a base portion for carrying the poison, and a cover. The base portion has outer case walls having a plurality of openings and has a poison located at the center of the case. The outer case may be of any configuration, e.g., round, square or rectangular.

The base has inner walls leading from the openings up to the poison and the walls are so positioned or shaped that a probe cannot contact the poison if thrust into any of the outer wall openings. The cover of the device is permanently affixed to the base.

The poison is preferably of the type known as bait, i.e., it is a mixture of slow acting poison and some food material attractive to insects, such as flour, molasses, peanut butter or the like. The bait is preferably of a paste-like or solid consistency. Thus, insects are attracted to the device, eat the bait and leave the device to die elsewhere. The bait may be a molded shape, e.g., a flat wafer, affixed to the floor of the inner compartment. In one embodiment of the instant invention, the cover which is affixed to the base has a downwardly projecting dimple positioned such that the lower end thereof contacts a solid poison bait, thereby providing a means to secure the bait in place, whether or not the bait is otherwise affixed to the floor of the inner compartment. In another embodiment, a depression may be formed in the floor of the inner compartment and a paste-like bait or a solid bait inserted thereinto, the floor of the base portion of the device being sloped upward from the outer edges thereof so that when the depression is formed it does not extend below the plane of the outer edges of the floor. In a still further embodiment, a solid bait may be inserted into a depression formed in the floor of the inner compartment and the cover formed with the downwardly projecting dimple such that the lower end thereof will contact the solid bait and secure the same within the depression.

In one embodiment of the present invention, the cover which is affixed to the base has at least a section thereof which is transparent so that the poison is visible therethrough. Alternatively, the entire cover may be transparent. In this latter embodiment, it may be desirable to coat the floor of the compartment with a contrasting color before putting down the bait; and more desirably the contrasting color may be luminous so that it is readily visible in darkened areas. As bait is removed by insects, the contrasting color underneath becomes visible and provides an indication whether insects are using the station and how much bait has been used.

The invention may be better understood by reference to the drawings in which.

Figure 1:
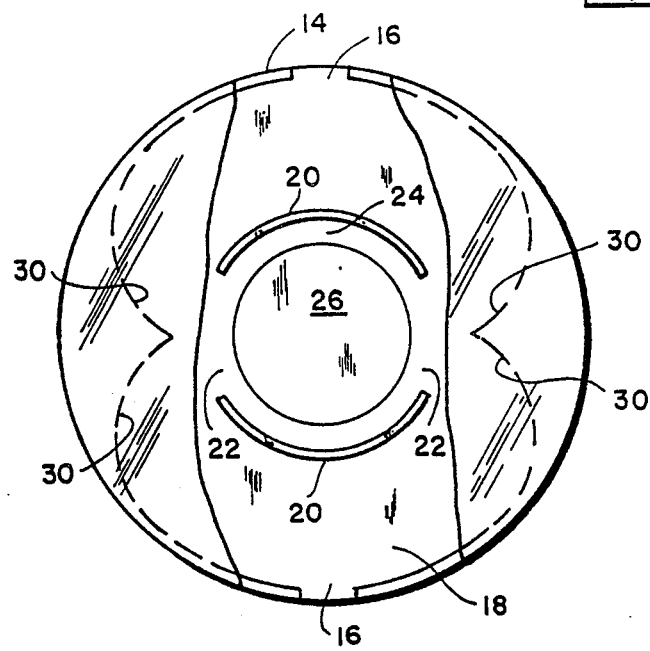
FIG. 1 is a top plan view of an embodiment of the invention having guide walls and baffle walls, with parts of the cover broken away.

Referring to FIG. 1, the insect feeding station of the present invention comprises a base portion 10 and cover 12. The base portion may be of any suitable material such as metal or plastic, and may be transparent plastic but need not be transparent. Base portion 10 has outer casing wall 14 with openings 16, a floor 18, inner compartment walls 20 with openings 22. Inner compartment wall 20 forms an inner compartment 24. Bait 26 is affixed to floor 18 in inner compartment 24. The floor of inner compartment may be coated with a contrasting color layer 28 before affixing the bait. When used, color layer 28 is preferably a luminescent material. This may be a coating of luminescent paint, or a luminescent dyed paper or the like. If the bait contains an oleagenous ingredient, it is desirable to coat color layer 28 with a protective material, e.g., a resin, before affixing the bait so that the color layer is not soaked with oil or grease and discolored or inactivated.

The inner surface of the outer casing wall 14 is curved inwardly at 30 to guide insects entering openings 16 towards openings 22 into the inner poison compartment 24. This is done to prevent an insect from entering at one outer opening 16, and wandering randomly along the inner wall and out the other opening 16.

Cover 12 extends to the periphery of outer casing walls 14 to close the base portion 10 and may also be of any suitable material. Cover 12 (as is the case with base portion 10) may be opaque or transparent or be partly opaque and partly transparent. When a suitable portion of the cover, or all of it, is transparent, the bait 26 may be readily seen. Although the cover has been illustrated as a flat disc, it will be readily apparent that it could also have an outer wall extending downwardly over outer wall 14 so long as the openings 16 are not obstructed. Cover 12 is permanently affixed to base 10, as by adhesive or any suitable means.

In one embodiment, the base portion 10 and cover 12 are both of opaque plastic. In another embodiment the base portion 10 is opaque and the cover 12 is transparent. In yet another embodiment, the base portion 10 and cover 12 are both transparent. Obviously too, a portion or portions of the floor and/or cover may be transparent and the remainder opaque.

As illustrated, the insect feeding station may be flat on the floor or other desired area. Insects may enter the device through openings 16 and are guided by curved walls 30 to offset openings 22 to reach bait 26 in the inner compartment, and may leave through the same openings. The consumption of bait 26 may be viewed through transparent cover 12, and be readily visible due to contrasting background 28 under the bait.

Although insects may easily reach the bait, it will be readily apparent in FIG. 1 that a probe placed in any opening 16 in the outer casing wall 14 will not enter the inner compartment 24 due to offset openings 22 in wall 20. Thus, the device is safe from inquisition children.

The device could also be mounted on vertical surfaces by means, for example, of double sided adhesive tape, not shown, on the lower surface 30 of base portion 10. Since bait 26 is affixed to the floor of, or otherwise rendered secure in the inner compartment 24, it will not be disturbed and will remain in the same position within the device.

Figure 2:
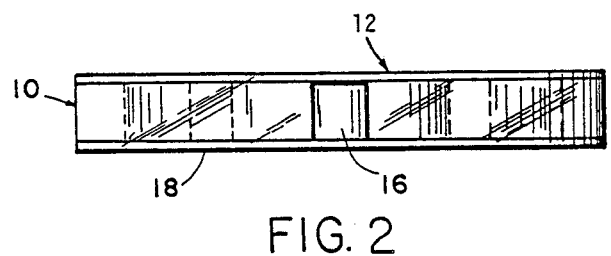
FIG. 2 is a view in elevation of the embodiment in FIG. 1.
Figure 3:
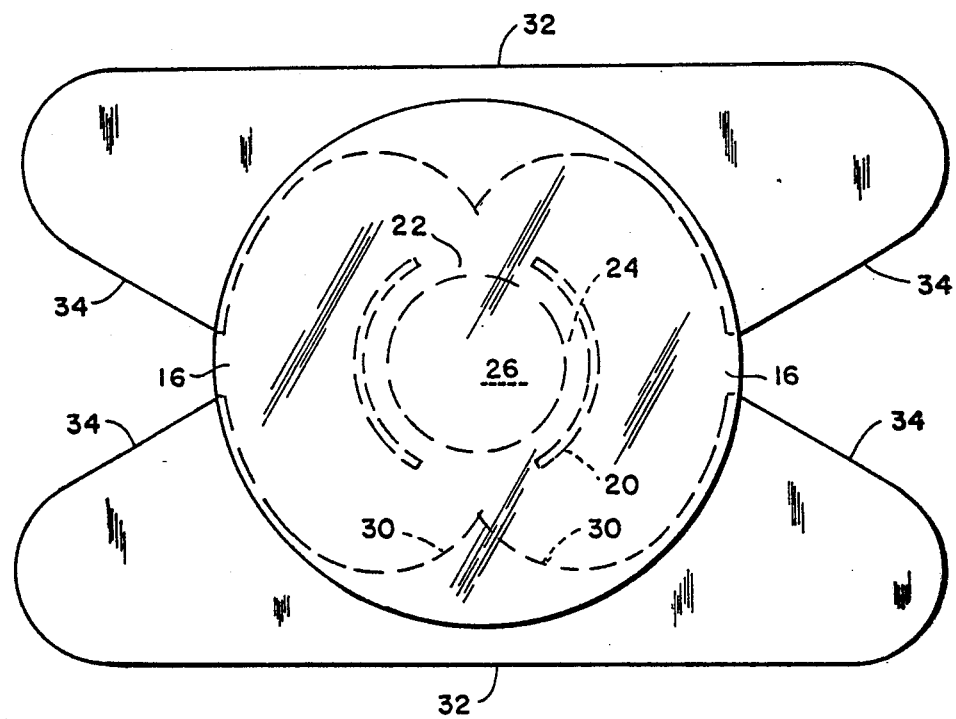
FIG. 3 is a top plan view of an embodiment of the invention having both outer and inner insect guide means.
Figure 4:
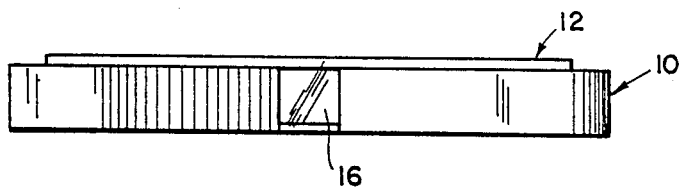
FIG. 4 is a view in elevation of the embodiment of FIG. 3.
Figure 5:
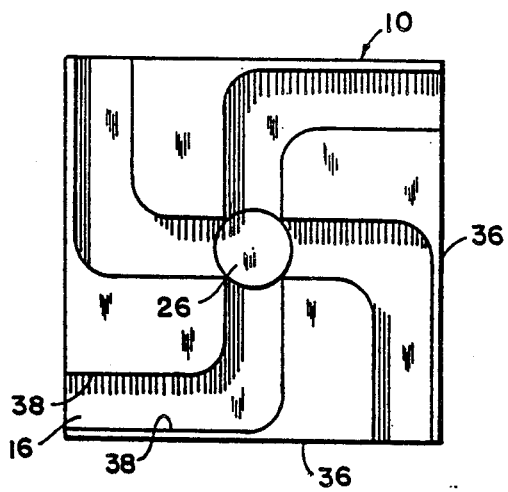
FIGS. 5 and 7 represent alternative embodiments of the guide and baffle walls.
Figure 7:
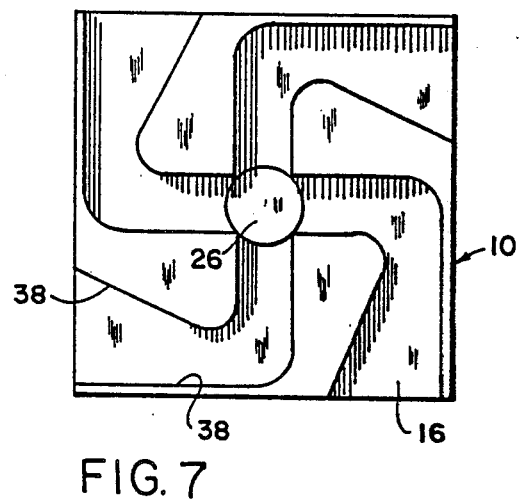
Figure 6:
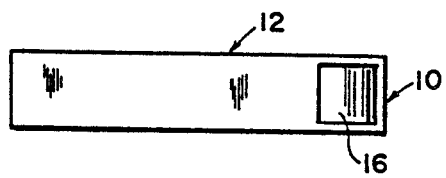
FIGS. 6 and 8 are views in elevation respectively of the embodiments shown in FIGS. 5 and 7.
Figure 8:
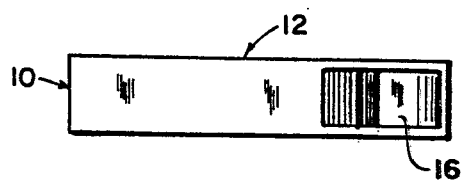

FIG. 3 illustrates an embodiment of the invention which is essentially similar to the embodiment of FIGS. 1 and 2 in the interior structure of the device. The outer case walls 32 are elongated and curved inwardly towards case openings 16 to provide outer guide walls 34. Guide walls 34 serve to direct insects toward opening 16 so that they will be more likely to enter the insect feeding station, and interior guide walls 30 direct the insects towards openings 22 into the inner compartment 24 and to poison 26.

In the embodiment of FIGS. 5 to 8, the openings 16 in outer casing walls 36, of base portion 10 are bounded by inner curved walls 38 directly to poison 26 by a curved path. Thus the walls 38 serve both as guide walls and a baffle means. Insects will be guided along walls 38 to poison 26, but a probe thrust into opening 16 could not reach poison 26. The device is thus safe from children. The cover 12 may have a part transparent to view poison 26, which may be placed over a contrasting and luminescent color layer.

Figure 9:
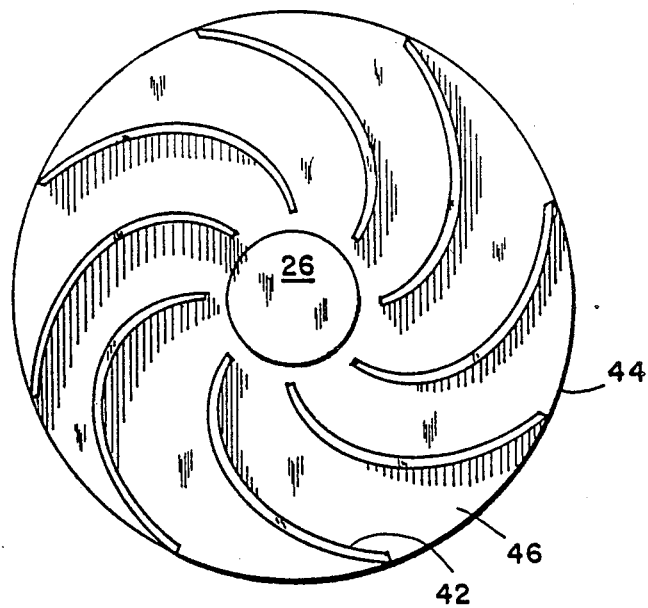
FIGS. 9 and 11 are top plan views of embodiments of the invention having a plurality of openings and guide and baffle walls.
Figure 10:
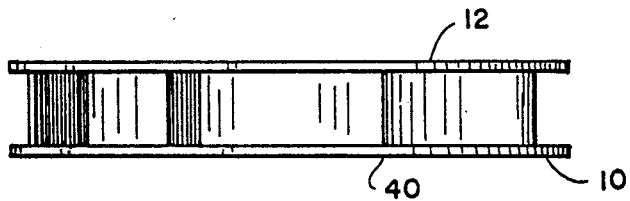
FIG. 10 is a view in elevation of the embodiment of FIG. 9.

In the embodiment of FIGS. 9 and 10, the device has a base portion 10 having a floor 40 with a poison 26 at the center thereof. The base portion 10 has a plurality of arcuate walls 42 extending from the periphery 44 of floor 40 essentially to the area of poison 26. There is in effect no outer wall to the device and the arcuate walls form a plurality of openings 46 leading directly to poison 26. A cover 12 extends to the outer ends of arcurate walls 42. Insects entering openings 46 will be guided along walls 42 to poison 26. The walls 42 have a curvature such that a probe thrust into opening 46 cannot contact poison 26. Poison 26 is placed over a contrasting and luminescent color material, and at least a portion of cover 12 is transparent so that poison 26 is visible through the cover.

Figure 11:
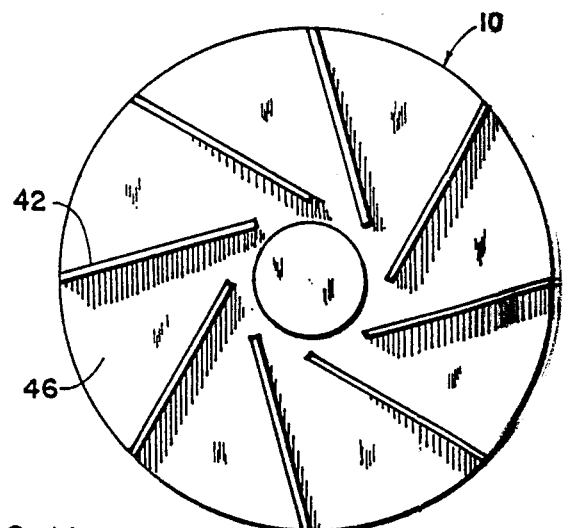

The embodiment of FIG. 11 is essentially similar to that shown in FIG. 9, except that it has a plurality of straight guide walls 48, instead of the arcuate walls 42 of the embodiment in FIG. 9. The straight guide walls 48 are directed from the periphery of the device tangential to poison area 26, so that the insects will be guided to poison area 26, but a probe inserted into any of the plurality of openings 46 cannot contact poison 26.

Figure 12:
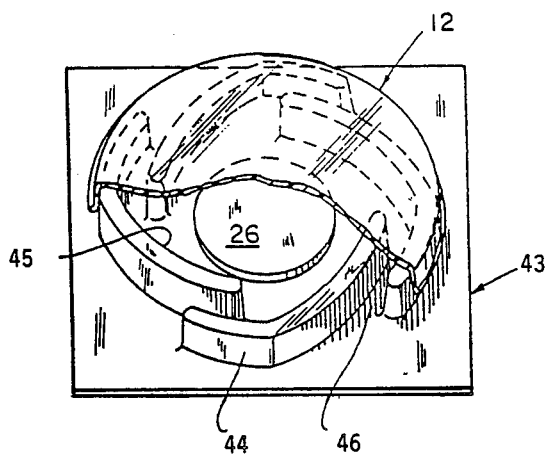
FIG. 12 is a top perspective view of an embodiment of the insect feeding station of the present invention, with part of the cover broken away, with alternative outer walls and guide means.
Figure 13:
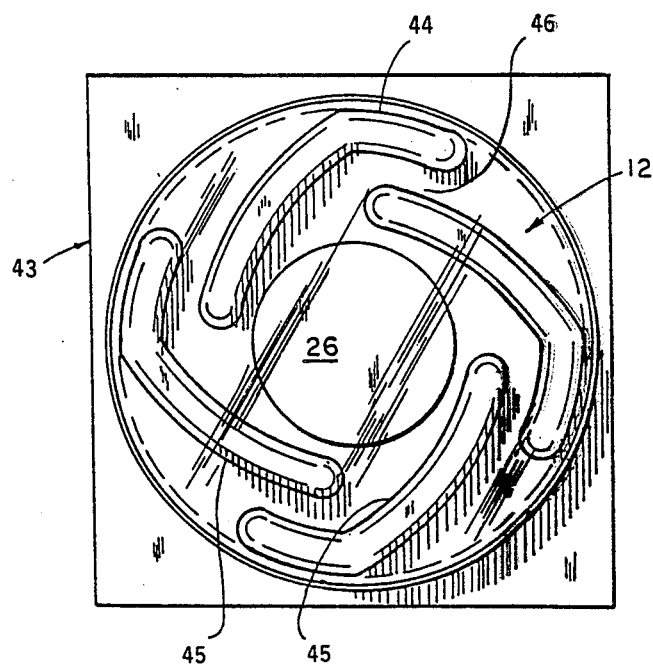
FIG. 13 is a top plan view of the embodiment of FIG. 12.
Figure 14:
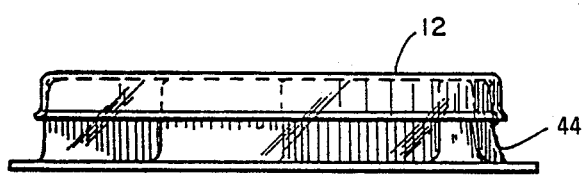
FIG. 14 is a view in elevation of the embodiment of FIG. 12.

The embodiment of FIGS. 12, 13 and 14 is similar to the embodiment shown in FIGS. 9 and 10, except the base portion 43 is essentially square, being vacuum formed from a flat sheet of plastic to form walls 44 and 45. The outer case walls 44 are elongated and curved inwardly towards the poison 26 to provide guide walls 45. The extended walls 44 form a plurality of openings 46 leading directly to poison 26. The cover 12 extends to the outer edges of wall 44. Insects enter the openings 46 and are guided along walls 45 to the poison 26. Obviously, the walls may be adjusted as desired, and need not be precisely as shown, so long as a probe thrust into any of the openings 46 cannot reach poison 26. Cover 12 may be transparent, as shown, or opaque (not shown), or partly opaque and partly transparent. When the cover 12 is at least partially transparent, the poison 26, preferably in the form of a solid bait wafer, may be placed over a contrasting color material, as states hereinabove, so that the poison is visible therethrough. In this embodiment as well, a probe inserted into any of the plurality of openings 46 cannot contact poison 26.

It will be seen that the present invention provides an insect feeding station for administering poison to insects, particularly crawling insects, wherein optionally a signal is provided allowing the ready detection of the removal of poisonous bait, even in dimly lit areas and without removing the device, which has means to guide insects to the poison and in which probing of the bait-containing compartment is not possible.

What is claimed is:

1. An insect feeding station for administering poison to insects comprising a base portion and a cover, said base portion having a floor with a concentric feeding area at the center thereof, poison located in said feeding area, and a plurality of walls arcuate in the horizontal plane extending from the periphery of the floor only to the periphery of the feeding area, and extending perpendicularly from the floor to the cover, said walls forming a plurality of openings at the periphery of said floor and at the periphery of said feeding area, and said walls further forming guide means to guide insect from said peripheral floor openings to said feeding area, said guide means also serving to guide insects away from said feeding area to said peripheral floor openings, and said cover extending to the outer ends of said walls.

2. The insect feeding station of claim 1 wherein there is no straight line access for an insect from the openings to said feeding area.

* * * * *